(12) United States Patent
Brunais et al.

(10) Patent No.: US 10,160,410 B2
(45) Date of Patent: Dec. 25, 2018

(54) SYSTEM AND METHOD FOR SUPPLYING AUXILIARY POWER TO AN ELECTRIFIED VEHICLE

(71) Applicant: Ford Global Technologies, LLC, Dearborn, MI (US)

(72) Inventors: Jesse D. L. Brunais, Livonia, MI (US); Douglas Raymond Martin, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1337 days.

(21) Appl. No.: 13/940,554

(22) Filed: Jul. 12, 2013

(65) Prior Publication Data

US 2015/0015065 A1   Jan. 15, 2015

(51) Int. Cl.
| | |
|---|---|
| *B60R 16/03* | (2006.01) |
| *B60L 11/18* | (2006.01) |
| *B60L 11/14* | (2006.01) |
| *B60L 11/12* | (2006.01) |
| *B60R 16/033* | (2006.01) |
| *B60L 3/00* | (2006.01) |

(52) U.S. Cl.
CPC ............... *B60R 16/03* (2013.01); *B60L 3/00* (2013.01); *B60L 11/123* (2013.01); *B60L 11/14* (2013.01); *B60L 11/1818* (2013.01); *B60L 11/1846* (2013.01); *B60L 11/1861* (2013.01); *B60R 16/033* (2013.01); *B60L 2230/34* (2013.01); *Y02T 10/6217* (2013.01); *Y02T 10/705* (2013.01); *Y02T 10/7005* (2013.01); *Y02T 10/7044* (2013.01); *Y02T 10/7077* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ...................................................... B60R 16/03
USPC ........................................................ 307/10.1
See application file for complete search history.

(56) References Cited

U.S. PATENT DOCUMENTS

| | | | |
|---|---|---|---|
| 3,163,252 A | 12/1964 | Koci | |
| 4,489,242 A | 12/1984 | Worst | |
| 4,857,807 A * | 8/1989 | Hargis | ................... B60Q 1/305 307/10.8 |
| 5,162,720 A * | 11/1992 | Lambert | ............... H02J 7/0024 307/150 |

(Continued)

FOREIGN PATENT DOCUMENTS

JP    02000050402 A  *  2/2000  ................ B60L 1/00

OTHER PUBLICATIONS

English Translation of Torii JP 0200250402 A; Feb. 2000.*

(Continued)

*Primary Examiner* — Jared Fureman
*Assistant Examiner* — James Evans
(74) *Attorney, Agent, or Firm* — Carlson, Gaskey & Olds (57) ABSTRACT

A power supply system for an electrified vehicle according to an exemplar aspect of the present disclosure includes, among other things, a primary power source and an auxiliary power source configured to selectively supply power in place of or in addition to the primary power source. At least one electrical connector is configured to connect the auxiliary power source to the power supply system.

5 Claims, 8 Drawing Sheets

(56) References Cited

U.S. PATENT DOCUMENTS

| | | | | |
|---|---|---|---|---|
| 5,251,721 A * | 10/1993 | Ortenheim | ............... | B60K 1/04<br>180/298 |
| 6,788,504 B2 | 9/2004 | Vanderkolk | | |
| 2003/0090235 A1 * | 5/2003 | Tsuji | ................... | B60L 11/1868<br>320/128 |
| 2005/0035657 A1 * | 2/2005 | Brummett | ........... | B60H 1/3226<br>307/10.1 |
| 2005/0226021 A1 * | 10/2005 | Do | ........................... | H02J 7/35<br>363/146 |
| 2006/0006009 A1 * | 1/2006 | Mennenga | ............... | B60K 6/26<br>180/65.25 |
| 2006/0162973 A1 * | 7/2006 | Harris | ..................... | B60K 1/04<br>180/65.31 |
| 2008/0020923 A1 * | 1/2008 | Debe | ........................ | B01J 23/42<br>502/100 |
| 2008/0143279 A1 * | 6/2008 | Oesterreicher | ......... | B60L 1/006<br>318/11 |
| 2010/0066302 A1 * | 3/2010 | Gregg | .................. | B60W 10/26<br>320/104 |
| 2010/0259359 A1 * | 10/2010 | Ishikawa | .............. | B60R 16/033<br>340/5.2 |
| 2011/0226539 A1 * | 9/2011 | Huss | ........................ | B60K 6/46<br>180/65.21 |
| 2011/0241349 A1 * | 10/2011 | Sankar | .................... | F03D 9/002<br>290/55 |
| 2012/0268068 A1 * | 10/2012 | Jung | ..................... | H01M 10/44<br>320/109 |
| 2013/0173102 A1 * | 7/2013 | Aldighieri | ............... | B60R 16/02<br>701/22 |
| 2013/0238180 A1 * | 9/2013 | Bold | .................. | B60H 1/00278<br>701/22 |
| 2014/0062352 A1 * | 3/2014 | Wang | ..................... | A01D 34/78<br>318/139 |
| 2014/0183942 A1 * | 7/2014 | Sugiyama | ............. | B60L 11/123<br>307/10.1 |
| 2015/0115708 A1 * | 4/2015 | Berry | ................... | B60L 11/005<br>307/10.1 |

OTHER PUBLICATIONS

The Alternative Energy Car Debate; by: JakeAuto; http://www.show.com/info_7747613_generators-electric-cars.html, Jun. 29, 2011.

Stalled_Out_on_Tesla's_Electric_Highway; http://www.nytimes.com/2013/02/10/automobiles/stalled-on-the-ev-highway.html?pagewanted=all&_r=l&.

* cited by examiner

SYSTEM AND METHOD FOR SUPPLYING AUXILIARY POWER TO AN ELECTRIFIED VEHICLE

TECHNICAL FIELD

This disclosure relates to an electrified vehicle, and more particularly, but not exclusively, to a power supply system that can supply both primary and auxiliary power to an electrified vehicle.

BACKGROUND

Hybrid electric vehicles (HEV's), plug-in hybrid electric vehicles (PHEV's), battery electric vehicles (BEV's) and other known electrified vehicles differ from conventional motor vehicles in that they employ one or more electric machines in addition or in alternative to an internal combustion engine to drive the vehicle. Electrified vehicles may be equipped with a battery that stores electrical power for powering the electric machines. In some vehicles, an electric machine may also be employed as a generator that is powered by the internal combustion engine in order to generate electrical power to charge the battery.

Electrified vehicles can typically travel limited distances before battery recharging is required. This may lead to operator range anxiety. Therefore, there remains a need for further contributions in this field of technology.

SUMMARY

A power supply system for an electrified vehicle according to an exemplary aspect of the present disclosure includes, among other things, a primary power source and an auxiliary power source configured to selectively supply power in place of or in addition to the primary power source. At least one electrical connector is configured to connect the auxiliary power source to the power supply system.

In a further non-limiting embodiment of the foregoing system, the primary power source is a high voltage battery.

In a further non-limiting embodiment of either of the foregoing systems, the auxiliary power source is a portable generator.

In a further non-limiting embodiment of any of the foregoing systems, the auxiliary power source is configured to selectively offload energy demand from the primary power source.

In a further non-limiting embodiment of any of the foregoing systems, the at least one electrical connector is disposed near a rear end of the electrified vehicle or under a hood of the electrified vehicle.

In a further non-limiting embodiment of any of the foregoing systems, a plurality of different electrical connectors are incorporated into the power supply system.

In a further non-limiting embodiment of any of the foregoing systems, the auxiliary power source is disposed on a shelving assembly mountable to a trailer hitch of the electrified vehicle.

In a further non-limiting embodiment of any of the foregoing systems, a cluster display is configured to select a load to place on the auxiliary power source.

In a further non-limiting embodiment of any of the foregoing systems, the cluster display includes at least a display unit and at least one input device.

In a further non-limiting embodiment of any of the foregoing systems, a control unit is configured to sense power communicated to the at least one electrical connector.

A method according to another exemplary aspect of the present disclosure includes, among other things, activating an accessory system of an electrified vehicle, offloading a portion of an energy demand of a primary power source to an auxiliary power source, and powering the accessory system with the auxiliary power source.

In a further non-limiting embodiment of the foregoing method, the accessory system is one of a climate control system, a lighting system, a consumer device powering station, or an electrically driven system.

In a further non-limiting embodiment of either of the foregoing methods, the method includes, prior to the step of offloading, selecting a load to place on the auxiliary power source.

In a further non-limiting embodiment of any of the foregoing methods, the method includes automatically reducing the load placed on the auxiliary power source in response to a fault condition of the auxiliary power source.

In a further non-limiting embodiment of any of the foregoing methods, the method includes charging the primary power source with the auxiliary power source or operating the electrified vehicle in a reduced power mode with the auxiliary power source.

A method according to another exemplary aspect of the present disclosure includes, among other things, providing at least one electrical connector on an electrified vehicle and supplying power to the at least one electrical connector via an auxiliary power source to at least temporarily supply power to the electrified vehicle.

In a further non-limiting embodiment of the foregoing method, the method includes charging a primary power source with the auxiliary power source or operating the electrified vehicle in a reduced power mode with the auxiliary power source.

In a further non-limiting embodiment of either of the foregoing methods, the method includes activating an accessory system of an electrified vehicle and offloading a portion of an energy demand of a primary power source to power the accessory system with the auxiliary power source.

In a further non-limiting embodiment of any of the foregoing methods, the method includes operating the electrified vehicle using the power from the auxiliary power source where other power is unavailable.

In a further non-limiting embodiment of any of the foregoing methods, the method includes selecting a load to place on the auxiliary power source prior to the step of supplying.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a system and method for selectively supplying auxiliary power to an electrified vehicle. The system and method of this disclosure may employ an auxiliary power source configured to selectively offload energy demand from a primary power source. One or more electrical connectors are incorporated into the electrified vehicle for connecting the auxiliary power source to a power supply system of the electrified vehicle. Among other features, the auxiliary power source can be used to charge the primary power source, operate the electrified vehicle in a reduced power mode, or power accessory systems of the electrified vehicle.

Figure 1:
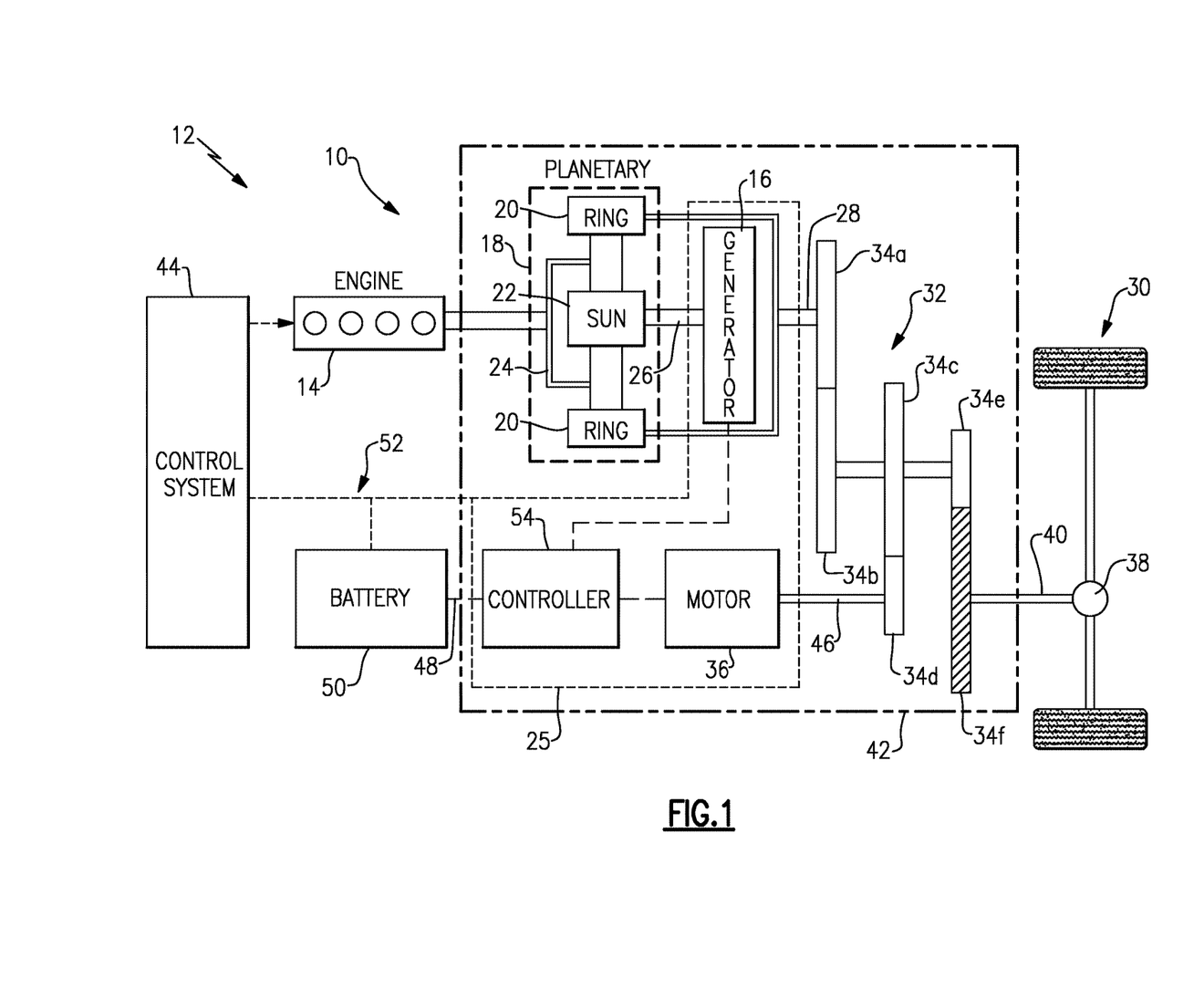
FIG. 1 schematically illustrates a powertrain of an electrified vehicle.

FIG. 1 schematically illustrates a powertrain 10 for an electrified vehicle 12, such as a HEV. Although depicted as a HEV, it should be understood that the concepts described herein are not limited to HEV's and could extend to other electrified vehicles, including but not limited to, PHEV's and BEV's.

In one embodiment, the powertrain 10 is a powersplit powertrain system that employs a first drive system that includes a combination of an engine 14 and a generator 16 (i.e., a first electric machine) and a second drive system that includes at least a motor 36 (i.e., a second electric machine), the generator 16 and a battery 50. For example, the motor 36, the generator 16 and the battery 50 may make up an electric drive system 25 of the powertrain 10. The first and second drive systems generate torque to drive one or more sets of vehicle drive wheels 30 of the electrified vehicle 12, as discussed in greater detail below.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the battery 50. The battery 50 may be a high voltage battery that is capable of outputting electrical power to operate the motor 36 and the generator 16. Other types of energy storage devices and/or output devices can also be incorporated for use with the electrified vehicle 12.

The motor 36, the generator 16, the power transfer unit 18, and the power transfer unit 32 may generally be referred to as a transaxle 42, or transmission, of the electrified vehicle 12. Thus, when a driver selects a particular shift position, the transaxle 42 is appropriately controlled to provide the corresponding gear for advancing the electrified vehicle 12 by providing traction to the vehicle drive wheels 30.

The powertrain 10 may additionally include a control system 44 for monitoring and/or controlling various aspects of the electrified vehicle 12. For example, the control system 44 may communicate with the electric drive system 25, the power transfer units 18, 32 or other components to monitor and/or control the electrified vehicle 12. The control system 44 includes electronics and/or software to perform the necessary control functions for operating the electrified vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 may also communicate with a battery control module of the battery 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

The electrified vehicle 12 may be operable to travel over a specific distance prior to energy depletion of the battery 50. This can result in operator range anxiety. Accordingly, the electrified vehicle 12 may be provided with a power supply system for increasing the travel range of the electrified vehicle 12. Example embodiments of such power supply systems are detailed below.

Figure 2:
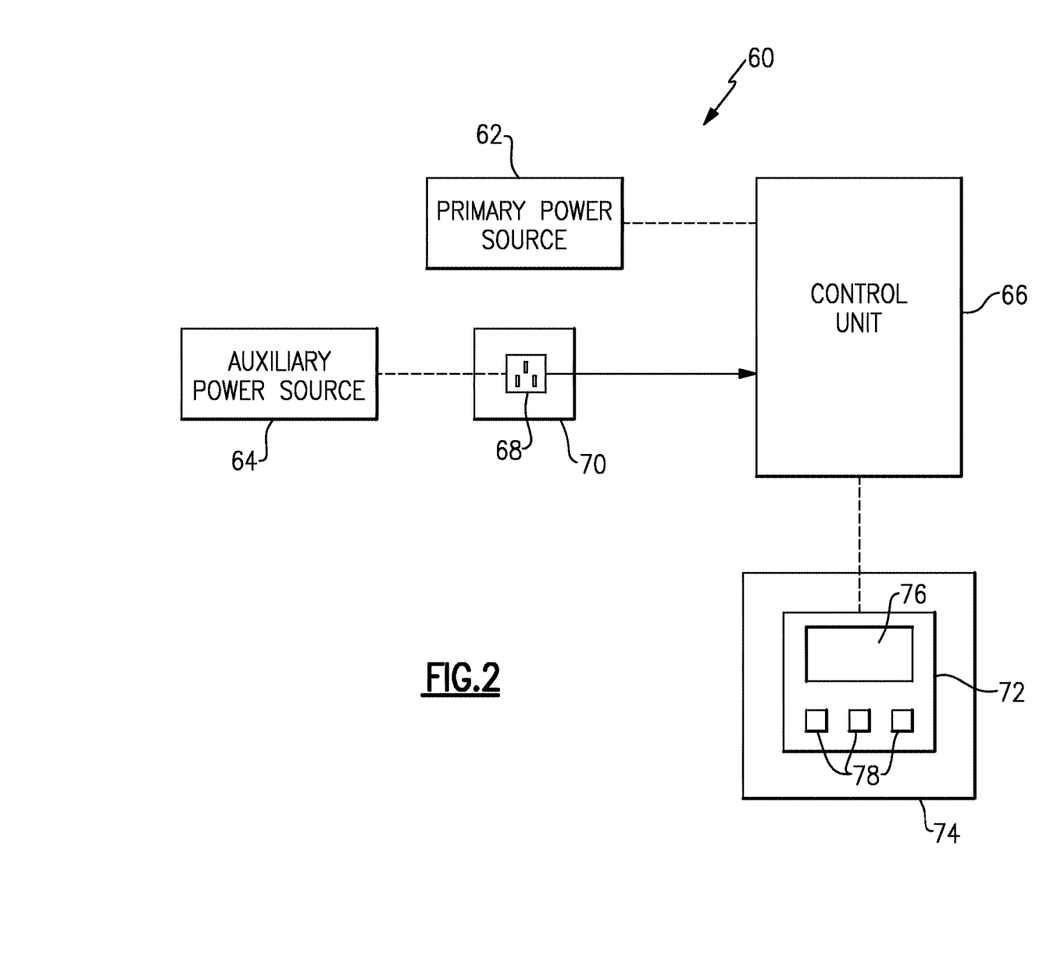
FIG. 2 illustrates a power supply system for an electrified vehicle.

FIG. 2 schematically illustrates a first embodiment of a power supply system 60 that can be incorporated into an electrified vehicle, such as the electrified vehicle 12 of FIG. 1. The power supply system 60 is operable to selectively supply auxiliary power to an electrified vehicle, such as to offload energy demand from other power sources or to power accessory systems.

The power supply system 60 of one embodiment includes a primary power source 62, an auxiliary power source 64, a control unit 66, and at least one electrical connector 68. Of course, this view is highly schematic and it will be appreciated that the power supply system 60 could include other components and other configurations.

In one embodiment, the primary power source 62 is a high voltage battery of an electrified vehicle (see, for example, the battery 50 of FIG. 1). The primary power source 62 may represent the main battery of an electrified vehicle. The primary power source 62 stores energy that can be used to power multiple loads of an electrified vehicle. For example, the primary power source 62 may supply power for operating the vehicle drive wheels 30 of the electrified vehicle 12 (see FIG. 1).

The auxiliary power source 64 is a power source separate from the primary power source 62 that can be utilized to selectively supply auxiliary power to an electrified vehicle. The auxiliary power source 64 may supply power in place of or in addition to the primary power source 62.

In one embodiment, the auxiliary power source 64 is a portable, gasoline driven generator. However, any commercially available or low wattage gasoline generator may be utilized as the auxiliary power source 64. Other auxiliary power sources may additionally or alternatively be utilized within the scope of this disclosure.

The auxiliary power source 64 may be connected to the power supply system 60 by the electrical connector 68. For example, in one non-limiting embodiment, the electrical connector 68 is a male connection that can be plugged into a female connection located on the auxiliary power source 64 to electrically connect the auxiliary power source 64 to the power supply system 60. Other connections embodying different configurations may alternatively or additionally be utilized.

In one embodiment, the electrical connector 68 is incorporated into an electrified vehicle. In other words, the electrical connector 68 is an integrated component of the electrified vehicle in much the same way that the engine 14 and the battery 50 are components of the electrified vehicle 12 (see FIG. 1). The electrical connector 68 is disposed at a first location 70 of an electrified vehicle. The first location 70 may be any location, including but not limited to, near a rear end of the electrified vehicle or under the hood of the electrified vehicle.

The control unit 66 is in communication with the primary power source 62 and the auxiliary power source 64 as well as other components and systems of an electrified vehicle. In one embodiment, the control unit 66 is a power distribution module. The control unit 66 includes the necessary hardware and software for controlling the power supply system 60 in order to supply power to one or more loads of the electrified vehicle. A more detailed description of the operation of the power supply system 60 is discussed below with reference to FIGS. 6 and 7.

The power supply system 60 may additionally include a cluster display 72 that provides a user with some control over operation of the power supply system 60. In one embodiment, the cluster display 72 is located at a second location 74 of the electrified vehicle. The second location 74 is a different location from the first location 70 of the electrical connector 68. In one non-limiting embodiment, the second location 74 is within a passenger compartment of the electrified vehicle.

In one embodiment, the cluster display 72 is configured to allow an operator of the electrified vehicle to select a load to offload from the primary power source 62 to the auxiliary power source 64. This may be necessary during certain vehicle conditions, such as a low charge condition of the primary power source 62. In another embodiment, the cluster display 72 is configured to allow an operator to select a load to place on the auxiliary power source 64 or to budget a load for powering accessory systems with the auxiliary power source 64.

The cluster display 72 includes at least a display unit 76 and one or more input devices 78. The display unit 76 displays information related to the power supply system 60, and the input devices 78 allow an operator to control the power supply system 60 in the manner described above. In one embodiment, the input devices 78 are actuable buttons.

Figure 3A:
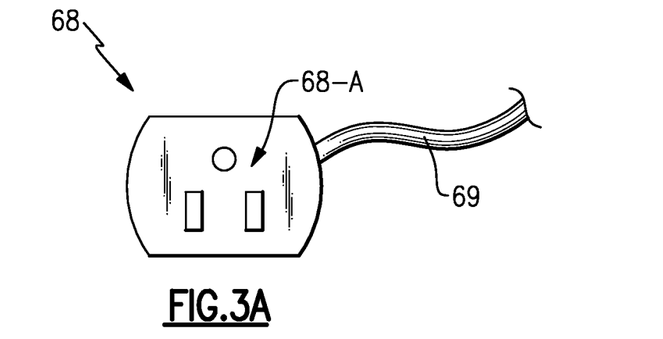
FIGS. 3A, 3B and 3C illustrate various electrical connectors that can be incorporated into an electrified vehicle.
Figure 3B:
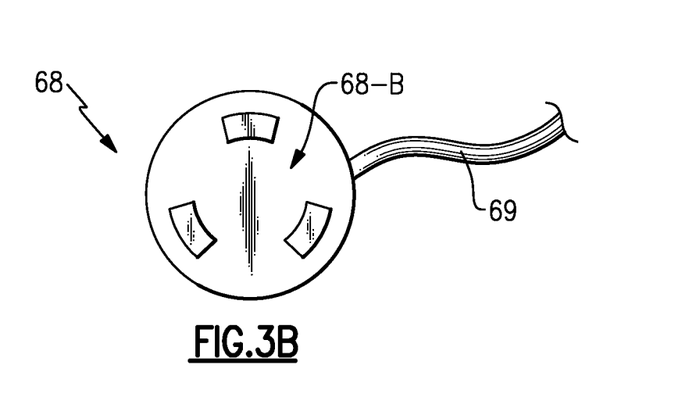
Figure 3C:
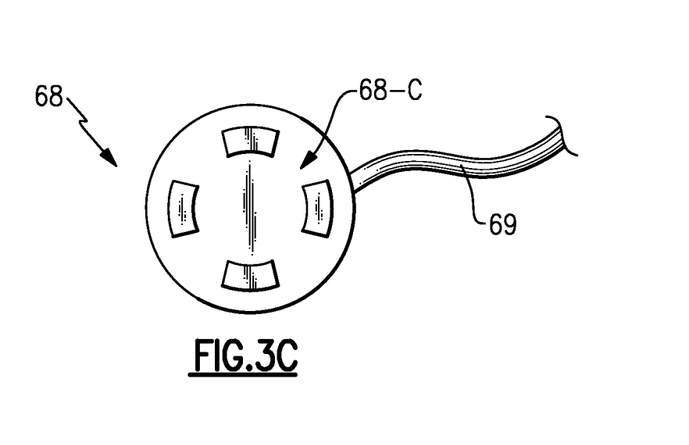

Referring to FIGS. 3A, 3B and 3C, the electrical connector 68 of the power supply system 60 may embody a variety of designs or configurations. For example, as shown in FIG. 3A, the electrical connector 68 may include a three pronged male connection 68-A for use with auxiliary power sources having a power rating of up to 2000 watts. In another embodiment, shown in FIG. 3B, the electrical connector 68 includes a three pronged male connection 68-B for use with auxiliary power sources having a power rating of up to 3,750 watts. In yet another embodiment, the electrical connector 68 is a four pronged male connection 68-C for use with auxiliary power sources having a power rating of up to 7,500 watts. A power cord 69 may be connected to the connections 68-A, 68-B and 68-C. It should be appreciated that the illustrated electrical connectors are intended to be non-limiting examples of the types of connections that could be used.

Figure 4A:
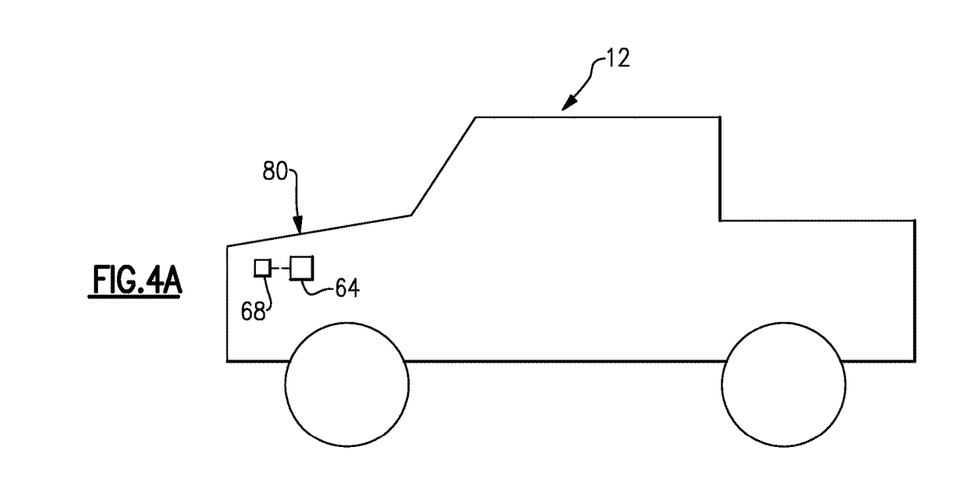
FIGS. 4A and 4B illustrate exemplary mounting locations for an auxiliary power source.
Figure 4B:
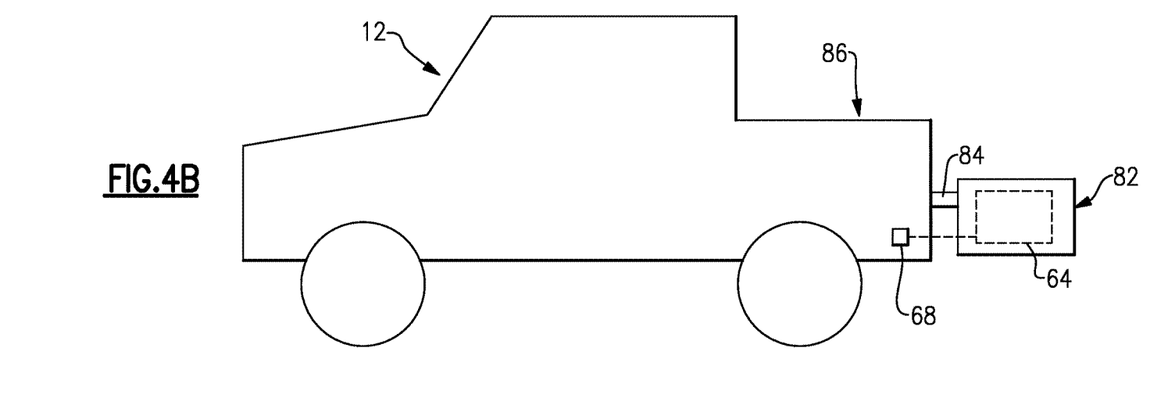

FIGS. 4A and 4B illustrate non-limiting embodiments of possible mounting locations for the auxiliary power source 64. In the FIG. 4A embodiment, the auxiliary power source 64 is disposed under a hood 80 of an electrified vehicle 12. This mounting location may be appropriate where the first location 70 (see FIG. 2) of the electrical connector 68 is also located under the hood 80. In this embodiment, the auxiliary power source 64 is integrated as part of the electrified vehicle 12.

Alternatively, as shown in FIG. 4B, the auxiliary power source 64 may be disposed on a shelving assembly 82 that is mountable to a trailer hitch 84 of the electrified vehicle 12. This mounting configuration may be utilized where the first location 70 of the electrical connector 68 is near a rear end 86 of the electrified vehicle 12. In this embodiment, the auxiliary power source 64 is readily removable from the electrified vehicle 12. In other words, the auxiliary power source 64 may be permanently incorporated into the electrified vehicle (see FIG. 4A) or can be removable therefrom (see FIG. 4B).

Figure 5:
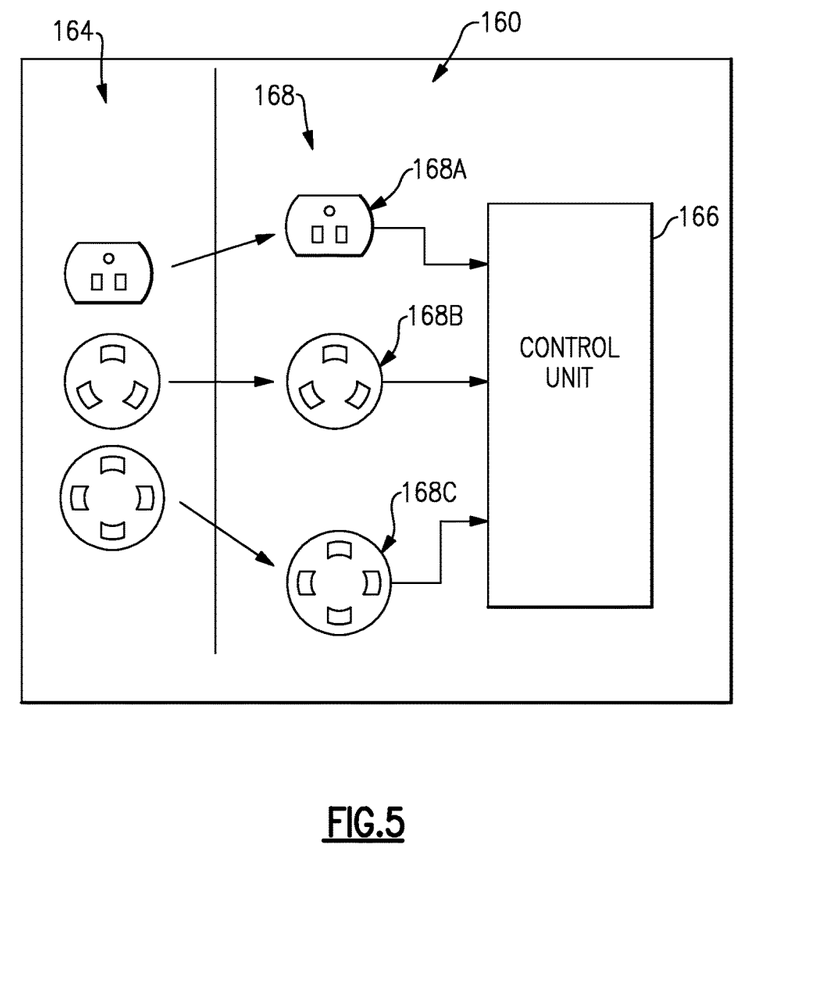
FIG. 5 illustrates a second embodiment of a power supply system.

FIG. 5 schematically illustrates portions of another exemplary power supply system 160. In this disclosure, like reference numbers designate like elements where appropriate and reference numerals with the addition of 100 or multiples thereof designate modified elements that are understood to incorporate the same features and benefits of the corresponding original elements.

In this embodiment, the power supply system 160 includes a plurality of electrical connectors 168 for connecting an auxiliary power source 164 to the power supply system 160. Each of the plurality of electrical connectors 168 can be provided on an electrified vehicle in order to accommodate various types of auxiliary power sources 164. In this embodiment, three different electrical connectors 168A, 168B and 168C are illustrated. However, other configurations are also contemplated as within the scope of this disclosure.

Each of the electrical connectors 168A, 168B and 168C may be in communication with a control unit 166 of the power supply system 160. In one embodiment, the control unit 166 is programmed to sense which of the electrical connectors 168A, 168B and 168C are being powered by the auxiliary power source 164. The control unit 166 may additionally communicate the auxiliary power from the auxiliary power source 164 to power various loads throughout an electrified vehicle.

A variety of methods or techniques are contemplated for utilizing the power supply system 60 (or power supply system 160) described above to supply auxiliary power to an electrified vehicle. Among other features, and as discussed in greater detail below, the power supply system 60, 160 may be utilized to selectively offload energy demand from the primary power source 62, charge the primary power source 62, operate the electrified vehicle 12 in a reduced power mode, power accessory systems of the electrified vehicle 12, or any combination of these applications.

Figure 6:
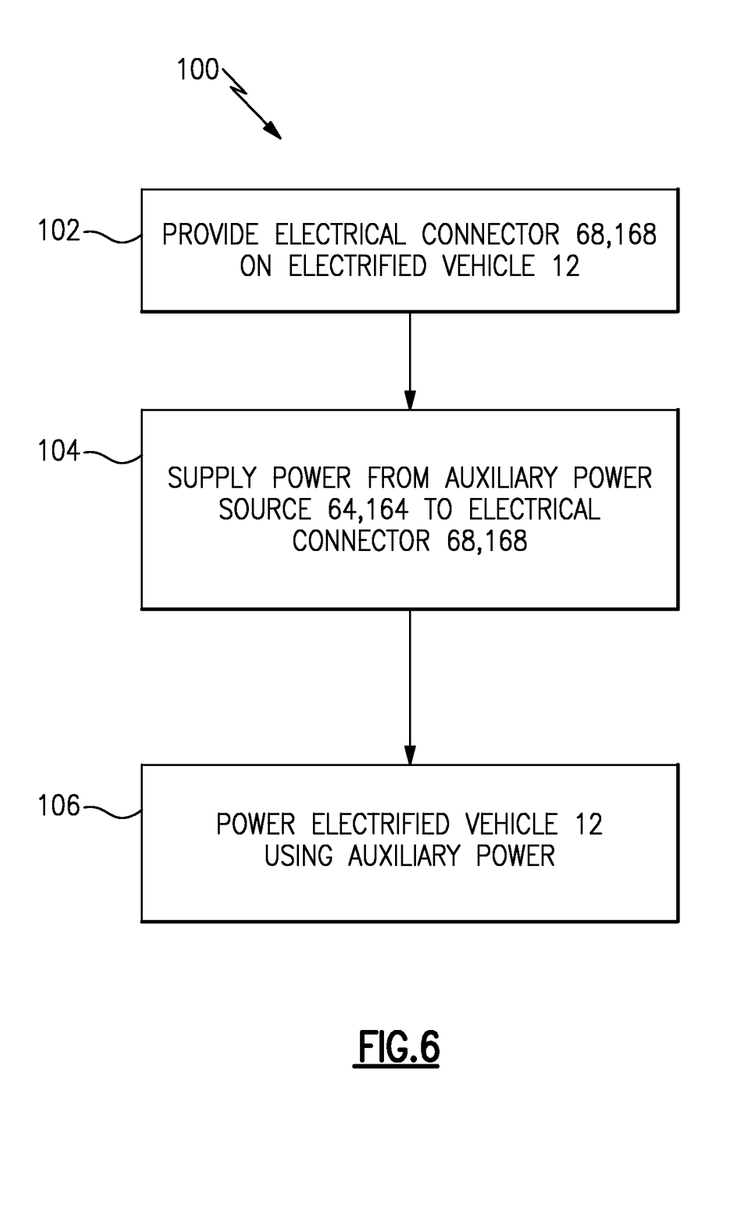
FIG. 6 schematically illustrates a method of supplying auxiliary power to an electrified vehicle.

For example, FIG. 6, with continued reference to FIGS. 1-5, schematically illustrates a first exemplary method 100 for supplying auxiliary power to an electrified vehicle 12. The method 100 begins at step 102 by providing at least one electrical connector 68, 168 on an electrified vehicle 12. One or more electrical connectors may be incorporated into the electrified vehicle 12. FIGS. 4A and 4B illustrate two non-limiting mounting locations for providing the electrical connector(s) 68, 168.

Next, at step 104, power may be at least temporarily supplied by the auxiliary power source 64, 164 to the electrical connector 68, 168. In one embodiment, an operator of the electrified vehicle 12 decides whether to supply power using the auxiliary power source 64, 164 by using the cluster display 72 or by plugging the electrical connector 68, 168 into the auxiliary power source 64, 164. In another embodiment, the control unit 66, 166 is programmed to automatically determine when to utilize auxiliary power from the auxiliary power source 64, 164. In one embodiment, the control unit 66, 166 commands use of power from the auxiliary power source 64, 164 when the primary power source 62 has a low charge condition or where power is otherwise not available from anywhere else within the electrified vehicle 12.

The power supplied by the auxiliary power source 64, 164 is used to power or operate all or portions of the electrified vehicle 12 at step 106. For example, in one non-limiting embodiment, the power supplied by the auxiliary power source 64, 164 can be used to charge the primary power source 62. This may be done where the control unit 66, 166 senses a low charge condition of the primary power source 62.

In another non-limiting embodiment, the power supplied by the auxiliary power source 64, 164 can be used to operate the electrified vehicle 12 in a reduced power mode. This may be done when the primary power source 62 is completely depleted of energy, for example. One exemplary reduced power mode may be referred to as a limp-home mode in which the auxiliary power source 64, 164 supplies just enough power to drive the vehicle drive wheels 30 at a relatively low speed (e.g., no greater than 5 miles per hour) to the nearest safe location or charge station. In yet another embodiment, the power supplied by the auxiliary power source 64, 164 can be used to both charge the primary power source 62 as well as operate the electrified vehicle 12 in a reduced power mode.

Figure 7:
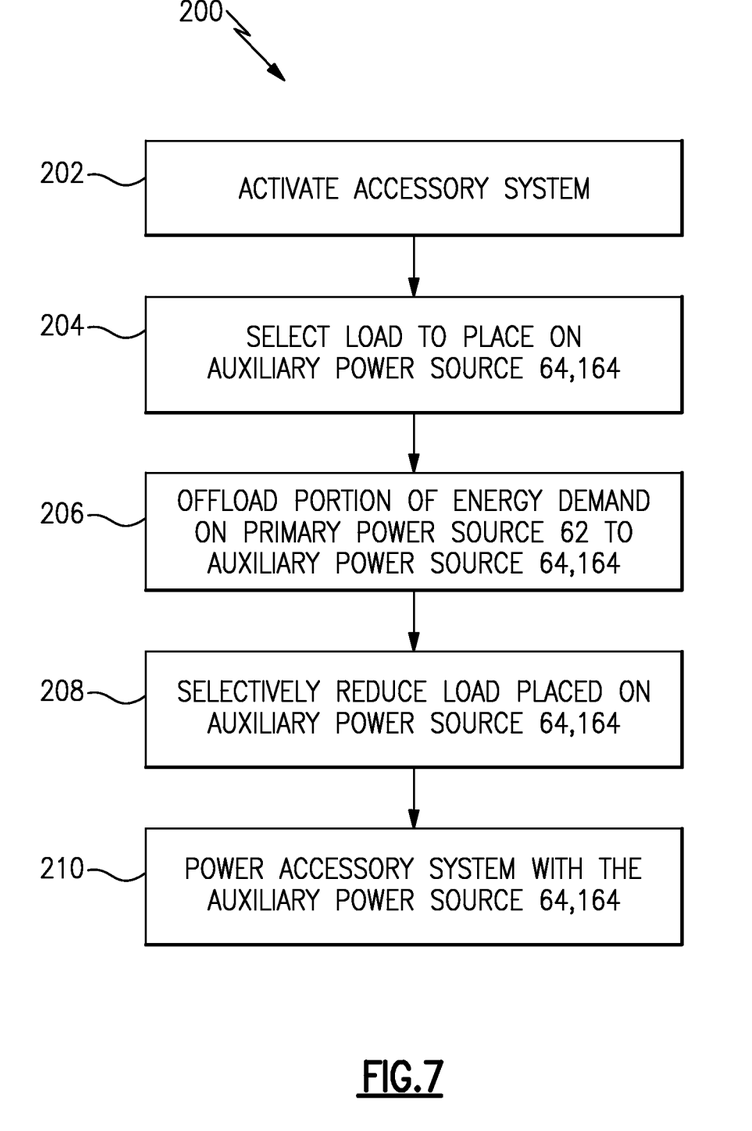
FIG. 7 illustrates another method of supplying auxiliary power to an electrified vehicle.

FIG. 7 schematically illustrates another embodiment of a method 200 for supplying auxiliary power to an electrified vehicle. In one embodiment, the method 200 may be used to power an accessory system or other load of the electrified vehicle 12. For example, the method may begin at step 202 by activating an accessory system of the electrified vehicle 12. The accessory system may be one of a climate control system (for heating and cooling the passenger compartment), a lighting system, a consumer device powering station, an electrically driven system, or any other load of the electrified vehicle 12. The accessory system is activated by an operator of the electrified vehicle 12, such as by turning on the accessory system within the passenger compartment. The accessory system may be activated by using the cluster display 72 or some other instrument panel.

Optionally, at step 204, a vehicle operator may select a load to place on the auxiliary power source 64, 164 for powering one or more accessory systems. A specific load may be selected and inputted by the operator using the input devices 78 of the cluster display 72. The selected load may be displayed on the display unit 76.

Next, at step 206, a portion of an energy demand on the primary power source 62 is offloaded to the auxiliary power source 64, 164. The energy demand offloaded onto the auxiliary power source 64, 164 may be directly proportional to the load selected at step 204. Alternatively, the control unit 66, 166 may be programmed to automatically offload a specific amount of energy demand to the auxiliary power source 64, 164.

The load placed on the auxiliary power source 64, 164 may optionally be reduced at step 208 in response to a fault condition of the auxiliary power source 64, 164. The control unit 66, 166 may be programmed to automatically reduce the load on the auxiliary power source 64, 164 in response to any condition of the auxiliary power source 64, 164.

Finally, at step 210, the accessory system may be powered using power from the auxiliary power source 64, 164. Powering the accessory system with the auxiliary power source 64, 164 reduces loads on the primary power source 62, thereby freeing the primary power source 62 for addressing other loads and potentially increasing the range capabilities of the electrified vehicle 12. The auxiliary power source 64, 164 may additionally or alternatively be used to charge the primary power source 62 and/or operate the electrified vehicle 12 in a reduced power mode within the scope of the method 200.

Figure 8:
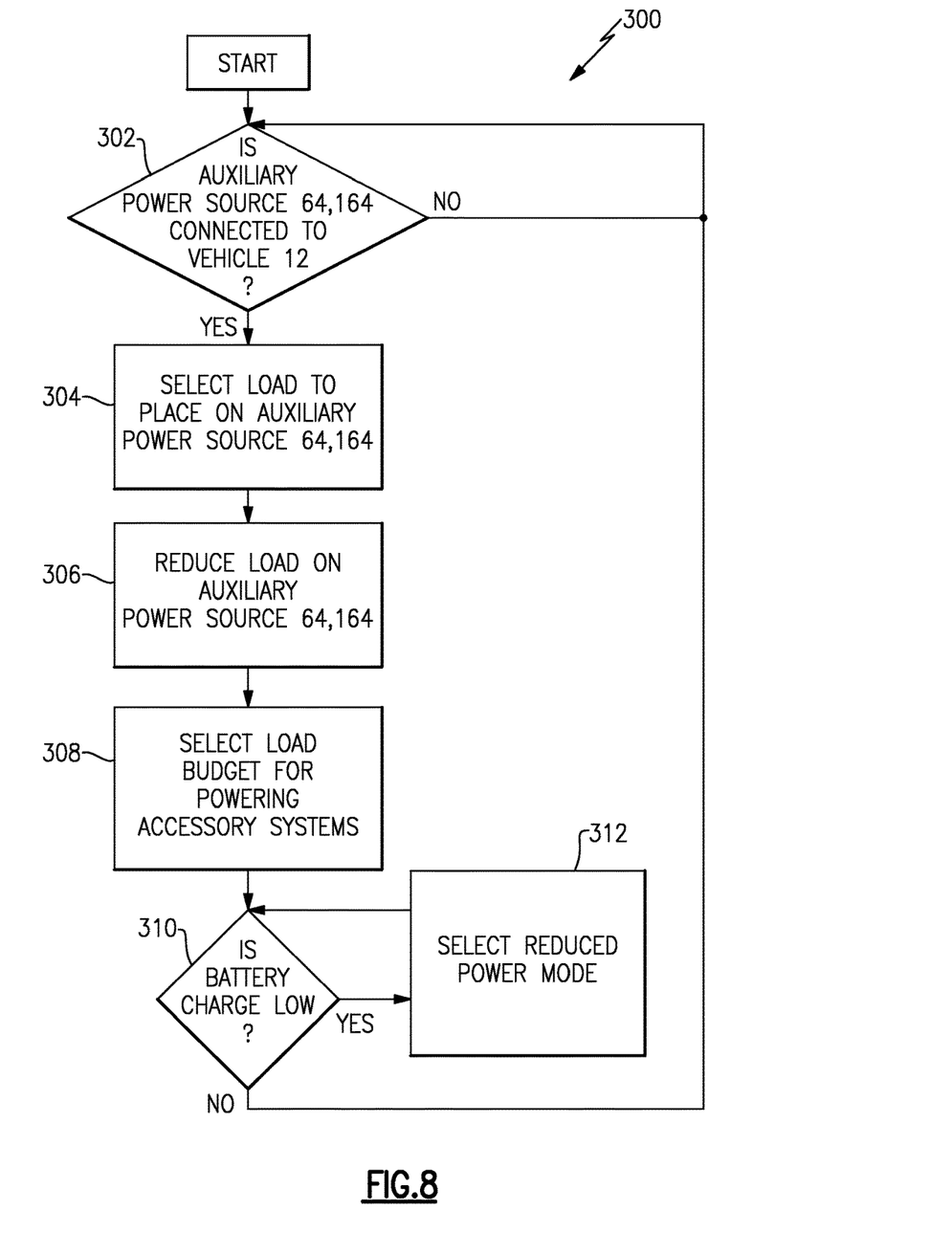
FIG. 8 illustrates a third embodiment of a method of supplying auxiliary power to an electrified vehicle.

FIG. 8 illustrates yet another embodiment of a method 300 for supplying auxiliary power to an electrified vehicle. At step 302, it is determined whether an auxiliary power source 64, 164 is connected to the electrified vehicle 12. This may be done manually by the vehicle operator or automatically by the control unit 66, 166. If not connected, the method 300 starts over. If connected, the method 300 proceeds to step 304.

A vehicle operator may select a load to place on the auxiliary power source 64, 164 at step 304. In one embodiment, a specific load may be selected and inputted by the operator using the input devices 78 of the cluster display 72. The selected load may be displayed on the display unit 76.

Next, at step 306, the load placed on the auxiliary power source 64, 164 may be reduced. The control unit 66, 166 may be programmed to automatically reduce the load on the auxiliary power source 64, 164 in response to any condition of the auxiliary power source 64, 164. For example, a low voltage condition or a shutdown condition of the auxiliary power source 64, 164 may prompt a reduction of the load.

A load budget for powering vehicle accessories may be selected at step 308. This selection may be based on the capacity of the auxiliary power source 64, 164 and may be programmed using the cluster display 72.

At step 310, a charge rate of the primary power source 62 is determined The charge rate may be monitored by the control unit 66, 166. If the charge rate is low, an operator has the option of selecting (via the cluster display 72) a reduced power mode at step 312 in which the electrified vehicle 12 is powered by the auxiliary power source 64, 164. If the charge rate is not low, the method returns to step 302.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
    activating an accessory system of an electrified vehicle, the electrified vehicle including at least one electric machine available for powering a wheel of the electrified vehicle;
    receiving a signal during operation of the electrified vehicle indicative of a load selected by a user to be placed on an auxiliary power source;
    offloading a portion of an energy demand of a primary power source to the auxiliary power source; and
    powering the accessory system with the auxiliary power source while powering other loads with the primary power source,
    wherein the accessory system is initially powered by the primary power source but is not powered by the primary power source while the energy demand is offloaded to the auxiliary power source.

2. The method as recited in claim 1, wherein the accessory system is one of a climate control system, a lighting system, a consumer device powering station, or an electrically driven system.

3. The method as recited in claim 1, wherein the auxiliary power source is a portable, gasoline driven generator.

4. The method as recited in claim 1, wherein the signal is automatically received in response to the load being entered into a cluster display located within a passenger compartment of the electrified vehicle.

5. The method as recited in claim 1, wherein the accessory system is activated by the user by turning on the accessory system within a passenger compartment of the electrified vehicle.

* * * * *